April 17, 1973  E. E. ELSON ET AL  3,728,227
MICROORGANISM CULTURE APPARATUS
Filed June 18, 1968  10 Sheets-Sheet 3

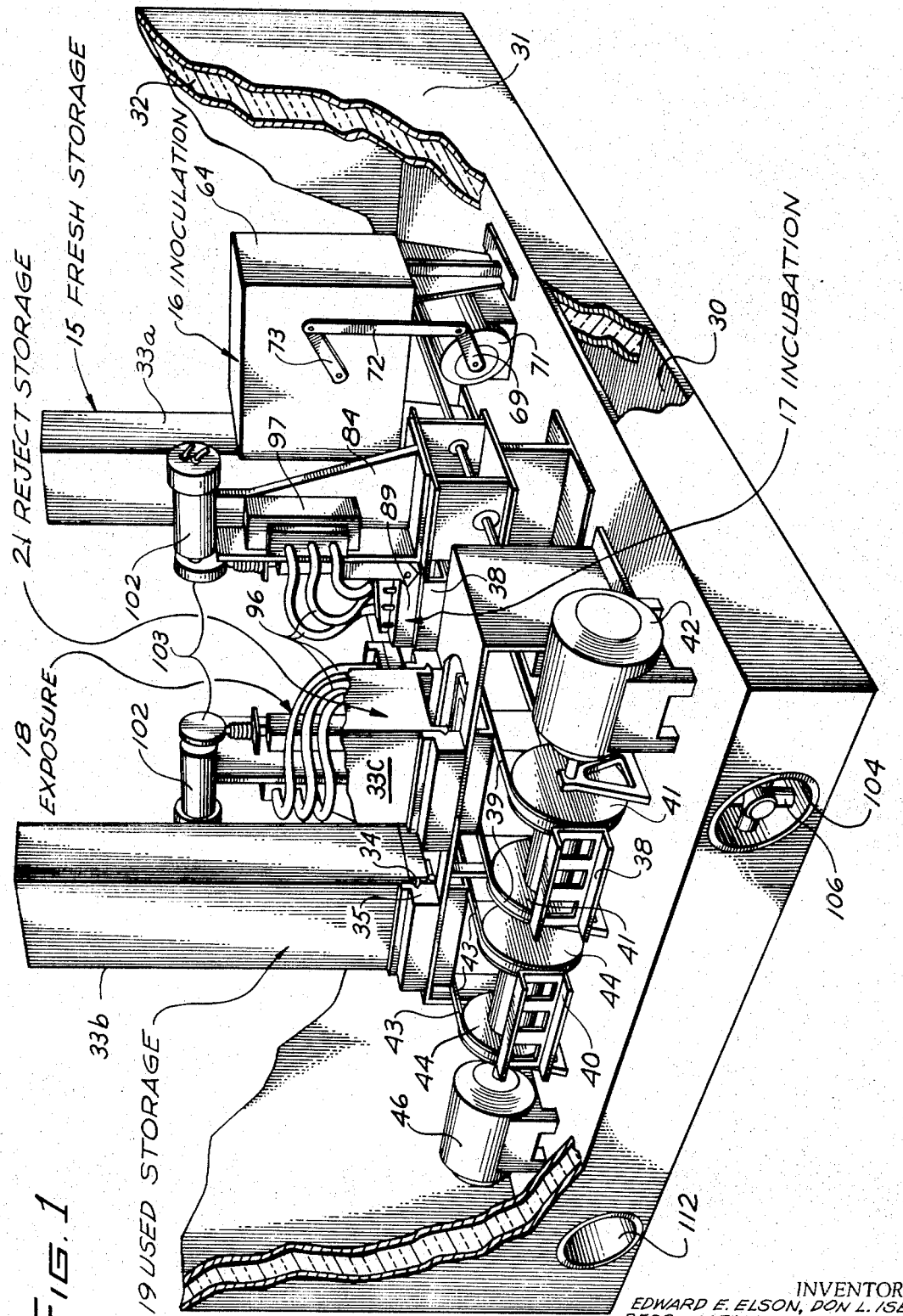

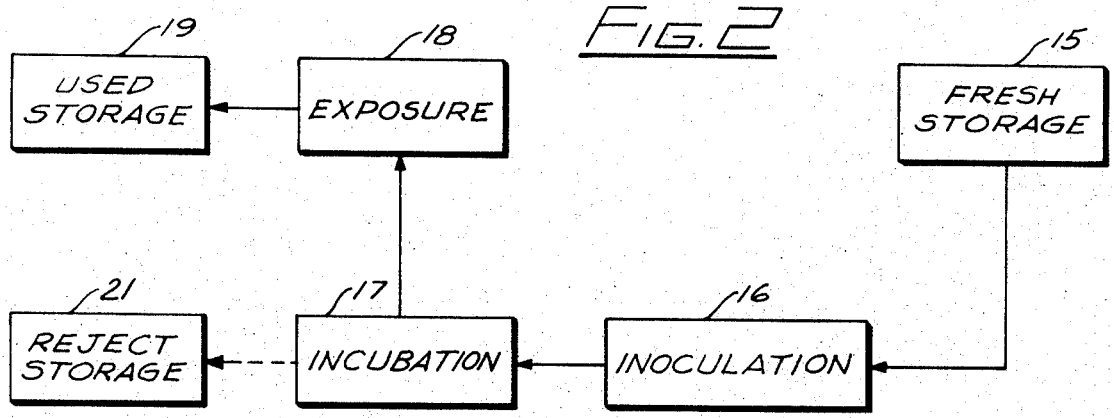
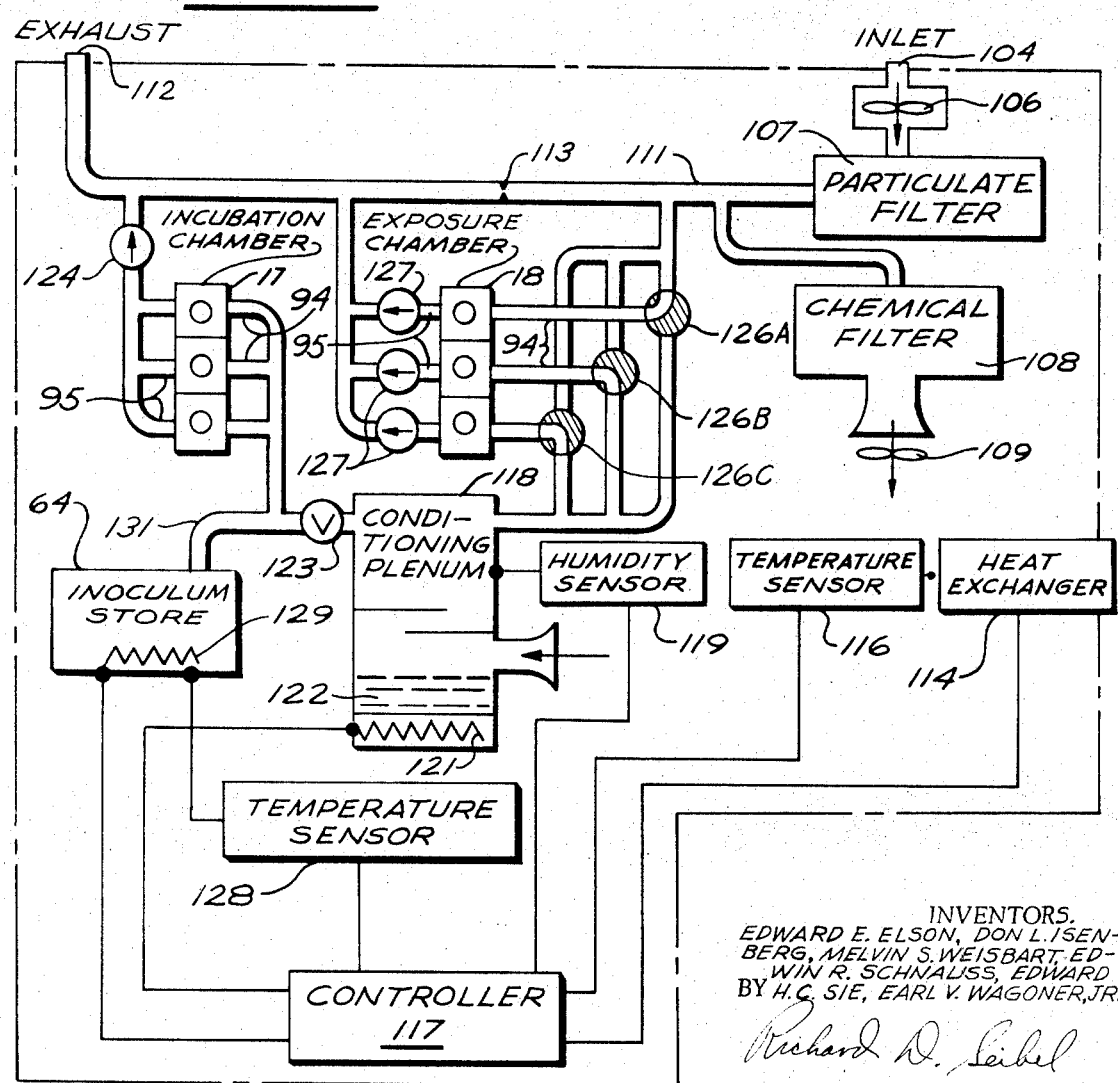

INVENTORS.
EDWARD E. ELSON, DON L. ISENBERG,
MELVIN S. WEISBART, EDWIN R. SCHNAUSS,
BY EDWARD H. C. SIE, EARL V. WAGONER JR.,

ATTORNEY

April 17, 1973  E. E. ELSON ET AL  3,728,227
MICROORGANISM CULTURE APPARATUS
Filed June 18, 1968  10 Sheets-Sheet 6

INVENTORS.
EDWARD E. ELSON, DON L. ISENBERG,
MELVIN S. WEISBART, EDWIN R. SCHNAUSS,
EDWARD H. C. SIE, EARL V. WAGONER JR.,
BY
Richard D. Seibel
ATTORNEY

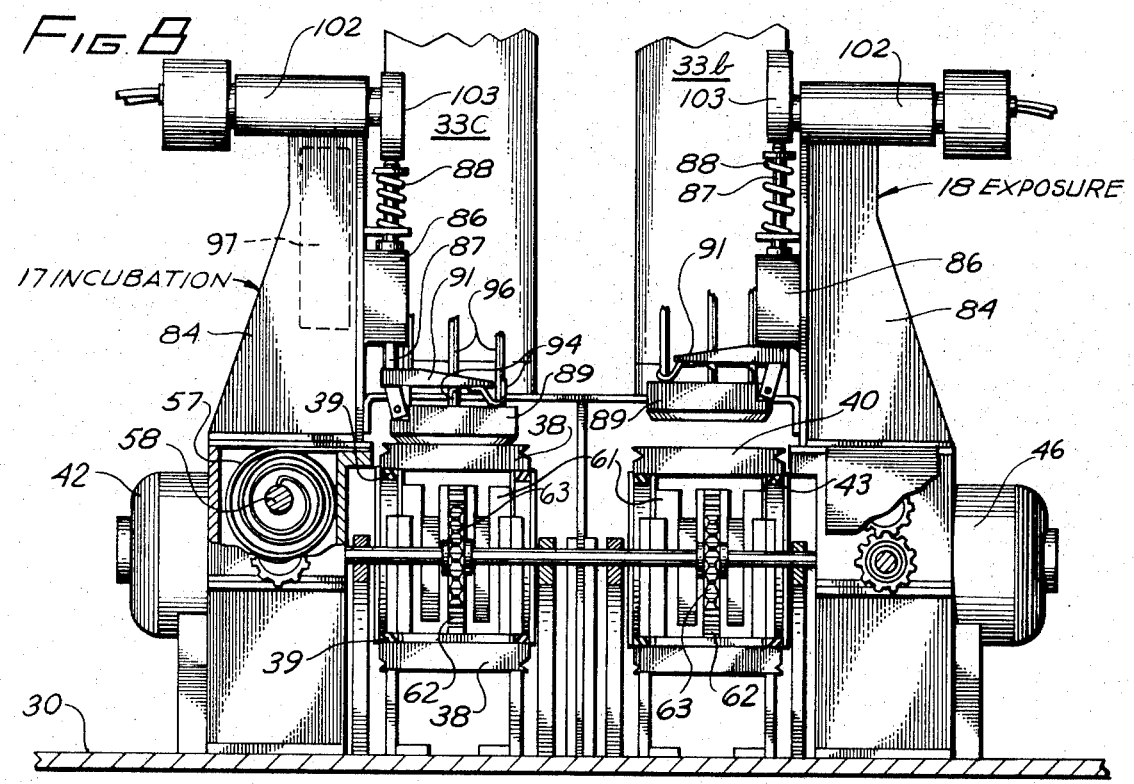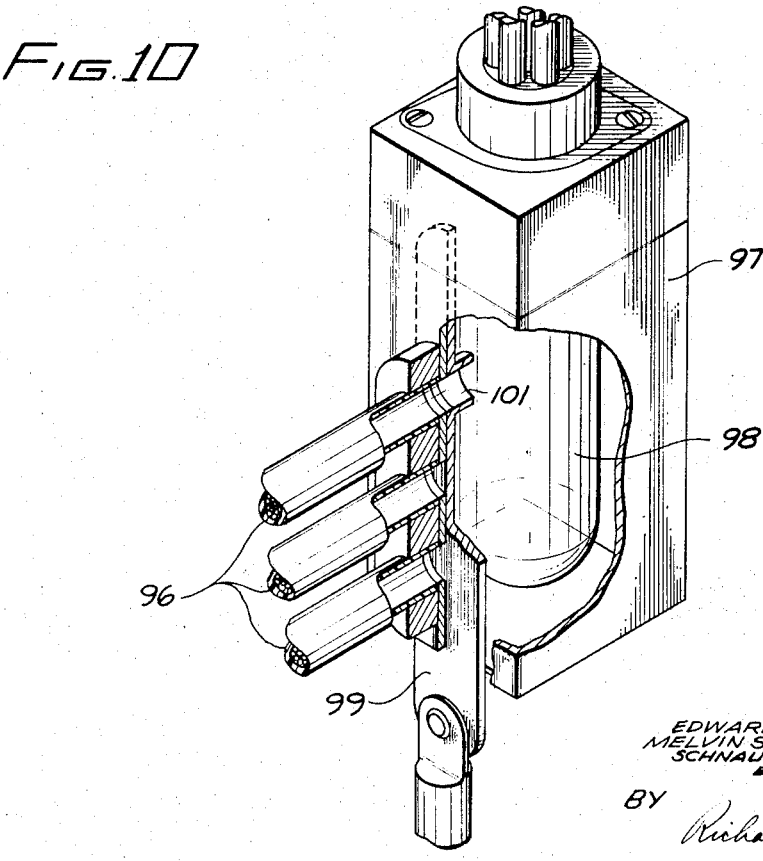

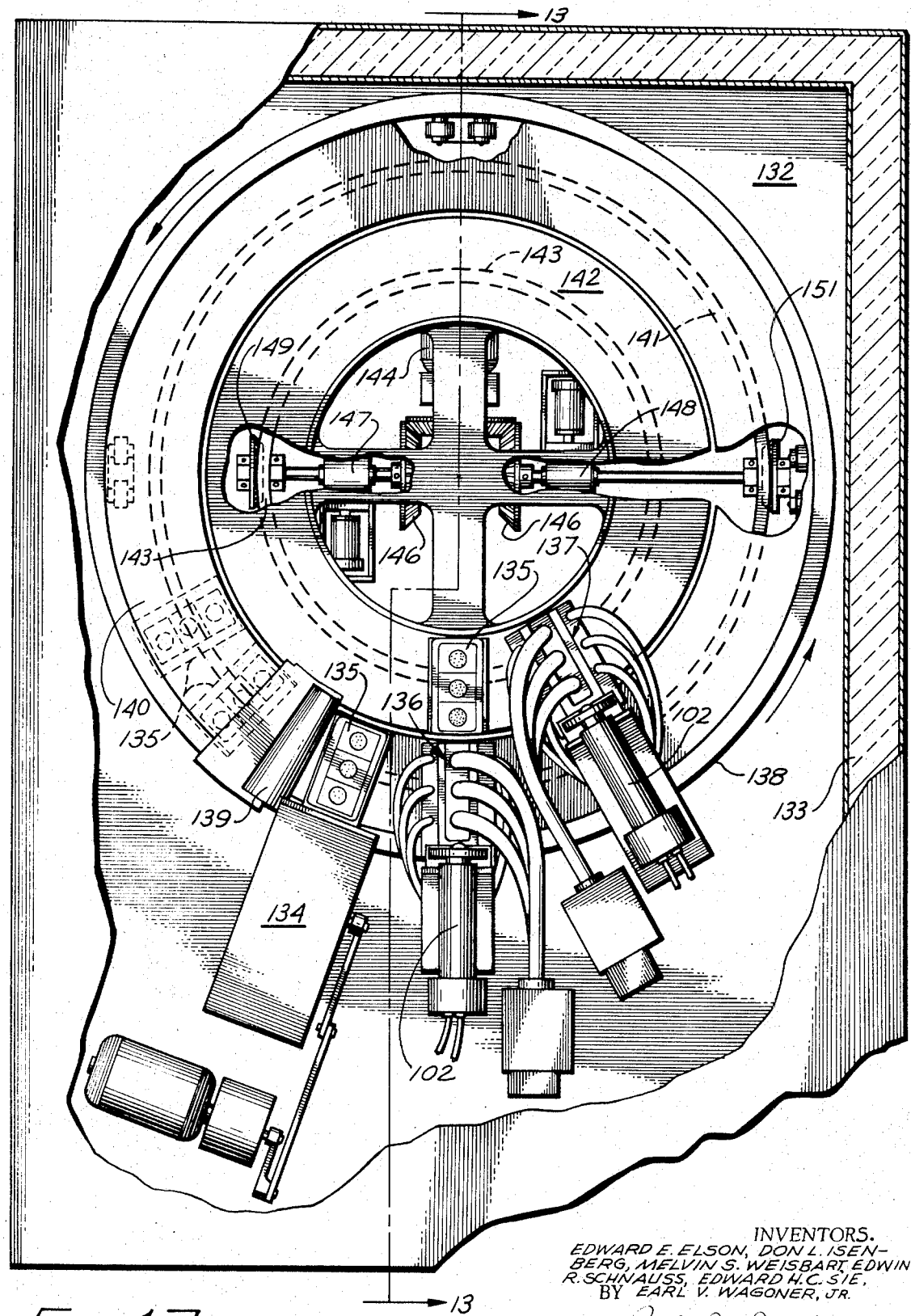

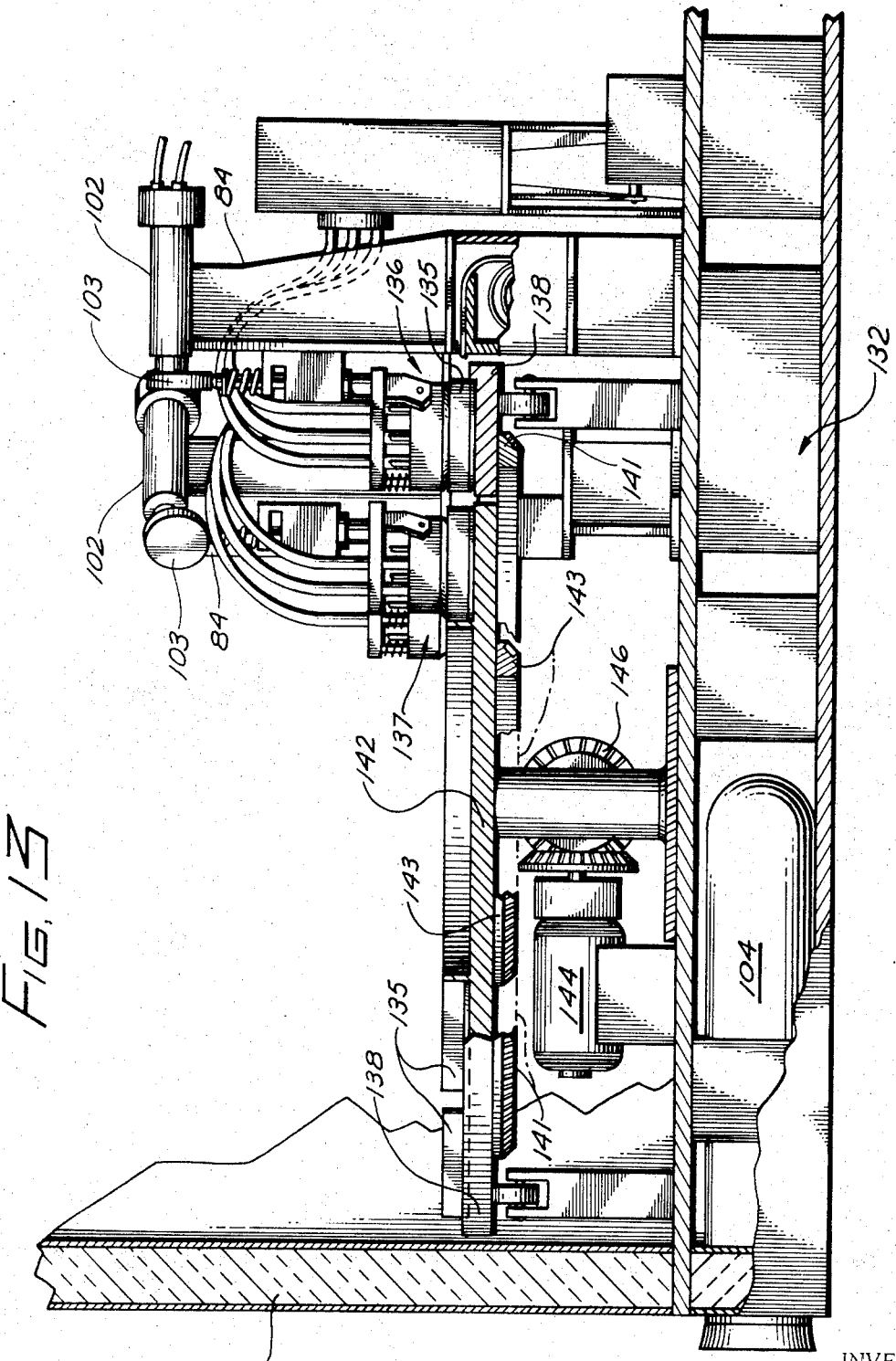

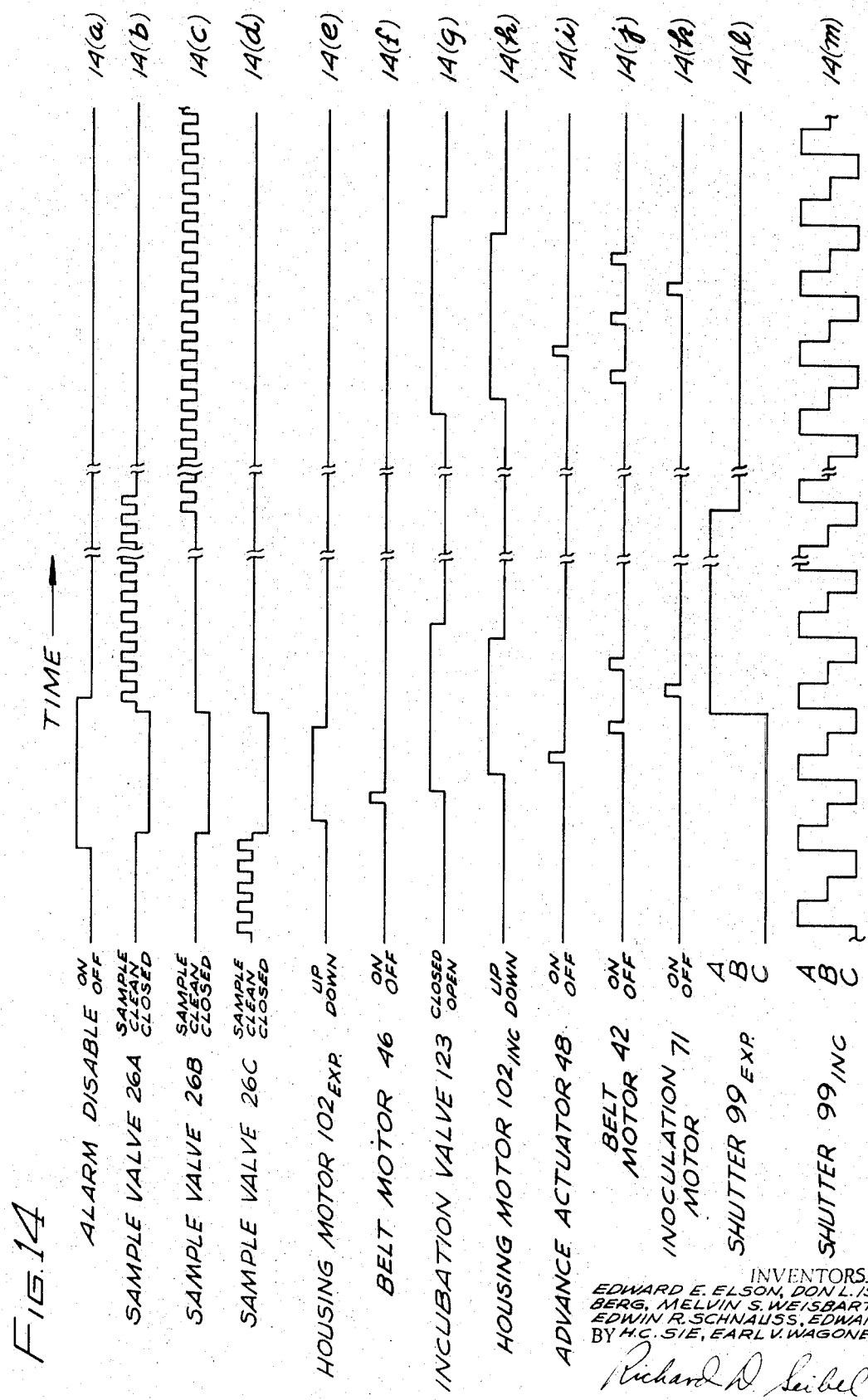

United States Patent Office 3,728,227
Patented Apr. 17, 1973

3,728,227
MICROORGANISM CULTURE APPARATUS
Edward E. Elson, Sherman Oaks, Don L. Isenberg, Irvine, Edwin R. Schnauss, Los Angeles, Edward H. C. Sie, Pacific Palisades, Earl V. Wagoner, Jr., San Pedro, and Melvin S. Weisbart, Huntington Beach, Calif., assignors to North American Rockwell Corporation
Filed June 18, 1968, Ser. No. 741,151
Int. Cl. C12k 1/00
U.S. Cl. 195—127                                                      13 Claims

ABSTRACT OF THE DISCLOSURE

Apparatus is described for storage, inoculation, incubation, and utilization of microorganisms, particularly those exhibiting luminescence. A plurality of stations are provided for performing these functions and a transport mechanism transports special culture vessels to successive ones of the stations during operation of the apparatus. Multiple vessels of sterile nutrient medium are stored and individually inoculated by an automatic inoculating mechanism. The resultant cultures of microorganisms are incubated in a controlled environment for optimum luminosity and then exposed to an environment which may contain toxic materials which will affect the luminous light output. An automatic warning system may signal presence of a toxic material. After use the cultures are stored within the apparatus for disposal. All of these operations are performed in a unified apparatus capable of operation for prolonged periods without maintenance.

BACKGROUND

It has been found that luminous cultures of microorganisms are responsive to the presence of various chemicals which may be toxic to the organisms. These materials affect the luminous light output from the culture of microorganisms and monitoring of light output before and after exposure of a culture to an environment suspected of containing a toxic material provides a reliable measure of the presence of a toxic material. The principles of detection of chemicals toxic to luminous microorganisms are described and claimed in U.S. Pat. 3,370,175 entitled, "Toxicant Detector" by A. L. Jordan et al., and assigned to North American Rockwell Corporation, assignee of this application.

Broadly, in the aforementioned patent, a technique is described wherein a culture of aerobic luminous microorganisms, such as bacteria, is grown on a surface of a solid substrate of nutrient and this culture is exposed to a flow of fluid which may contain a toxic material. Upon exposure to a chemical toxic to the microorganisms a pronounced change in light output occurs and photoelectric monitoring of light output provides a reliable indicator of the presence of the toxic material in the fluid.

The advantages of a culture of microorganisms over conventional physico-chemical sensors are many because of the inherent characteristics and capabilities of living biological systems. This represents a direct approach to detection of toxic materials. A chemical is only toxic with respect to a living system. The microorganisms utilized are only responsive to toxic environments and responds to some extent to most environments toxic to other living systems. In practical terms, this means that a culture of microorganisms is less likely to give false alarms and more likely to recognize a truly toxic atmosphere than a physico-chemical sensor. Concomitant with the sensitivity of microorganisms to a broad spectrum of toxic materials is the characteristics response of various strains of microorganisms to selected materials. Each strain has different response characteristics to given classes of toxic materials and if, in a given use of a detector, a particular toxicant is anticipated, a strain particularly sensitive to that material is readily selected. This is done without sacrificing the ability of the detector to detect other toxic materials (although possibly with reduced sensitivity) and there is the further advantage inherent in comparing the response of two or more strains simultaneously to more positively identify the toxicant encountered.

Another advantage of the culture of microorganisms lies in the ability to recover from small doses of toxicant. This provides capability for semi-quantitative evaluation of hazard, a repeated alarm, or an "all-clear" signal; all with only modification of the electronic monitoring system.

A little appreciated attribute of microorganisms is their predictability of reliability. With higher life forms where a brain or reasonable facsimile is present, predictability is low; however, microorganisms respond to a given stimulus in a completely predictable manner. This means that the limiting reliability of an apparatus employing luminous microorganisms for detection of toxic materials is not the culture but rather the components of the system that maintain and monitor its response. No complex electronic logic circuitry is required, because the living cells provide the necessary logic circuitry, not just one logic circuit but several billion. The light output represents the summation of response of billions of sensors. This provides extreme response reliability in a small, inexpensive package. There is much experience to provide confidence in the handling of microorganisms and when this handling is carefully controlled and duplicated, the full predictability of a culture of microorganisms is realized. In order to achieve maximum predictability it is therefore preferred to employ automatic equipment for most phases of microbial growth and utilization.

In many situations it is also desirable that equipment for monitoring an environment for the presence of toxic materials operate for substantial periods of time without attendance or maintenance. Such an apparatus permits continuous monitoring of the environment over substantial time intervals in remote locations and also by automating the handling of cultures of microorganisms, the need for highly trained personnel is minimized.

Such long term continuous monitoring by means of luminous microorganisms is found to be difficult since the cultures of microrganisms have a relatively limited span of useful lifetime. Thus, it is found that in a typical culture of microorganisms about one day is required to grow a culture to optimum luminosity and the useful lifetime of the culture extends for only about another day.

SUMMARY OF THE INVENTION

Thus in the practice of this invention according to a preferred embodiment there is provided apparatus for growing cultures of microorganisms comprising means for storing a plurality of vessels of sterile nutrient medium, means for inoculating the nutrient medium of individual ones of the vessels with small amounts of microorganisms followed by incubation of the microorganisms on the inoculated medium for producing a viable culture of substantial size. Thereupon means are provided for utilizing microorganisms which in a preferred embodiment comprises photoelectrically monitoring light output from a luminous culture of microorganisms. Transport means are also provided for transporting the vessels of nutrient medium between successive stations in an apparatus for automatically growing and utilizing the microorganisms.

FIGURES

Objects and many of the attendant advantages of this invention will be readily appreciated as the same becomes better understood by reference to the following detailed description when considered in connection with the accompanying drawings wherein:

FIG. 1 comprises a perspective cutaway view of an automatic apparatus for growing and utilizing microbiological cultures;

FIG. 2 comprises a block diagram of the apparatus of FIG. 1;

Figure 7:
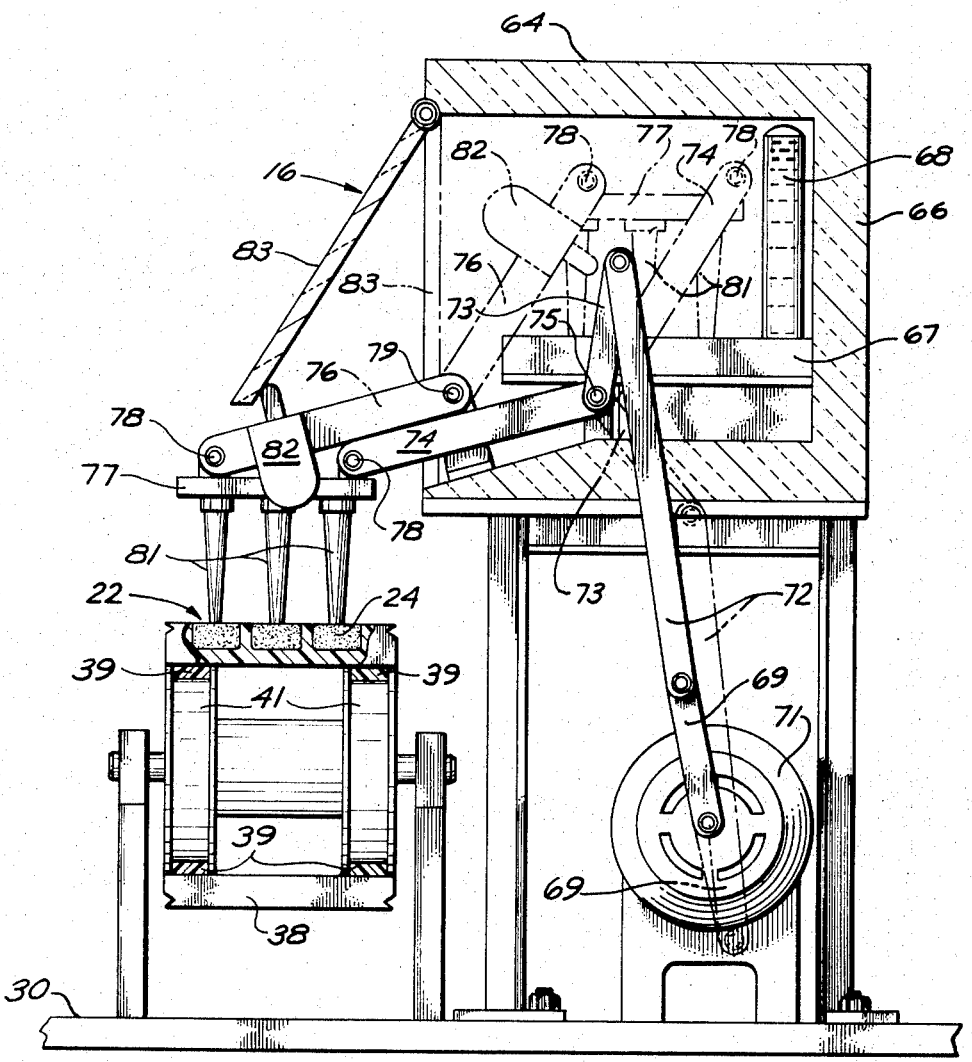
Figure 3:
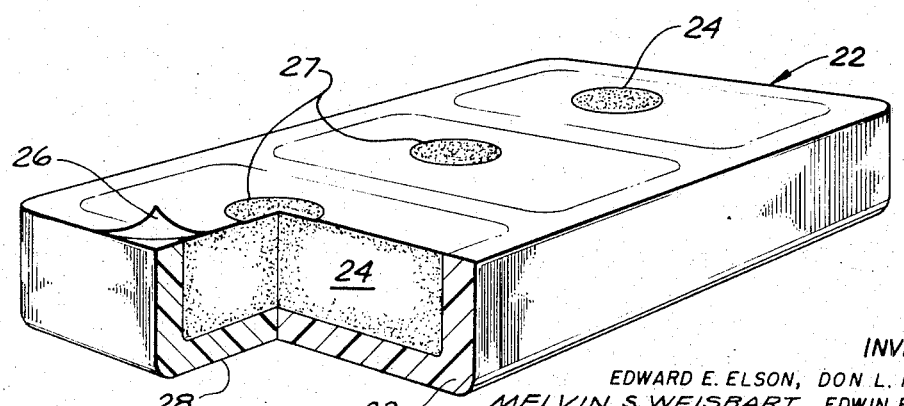
FIG. 3 illustrates a typical nutrient medium plate for growing microorganisms.
Figure 5:
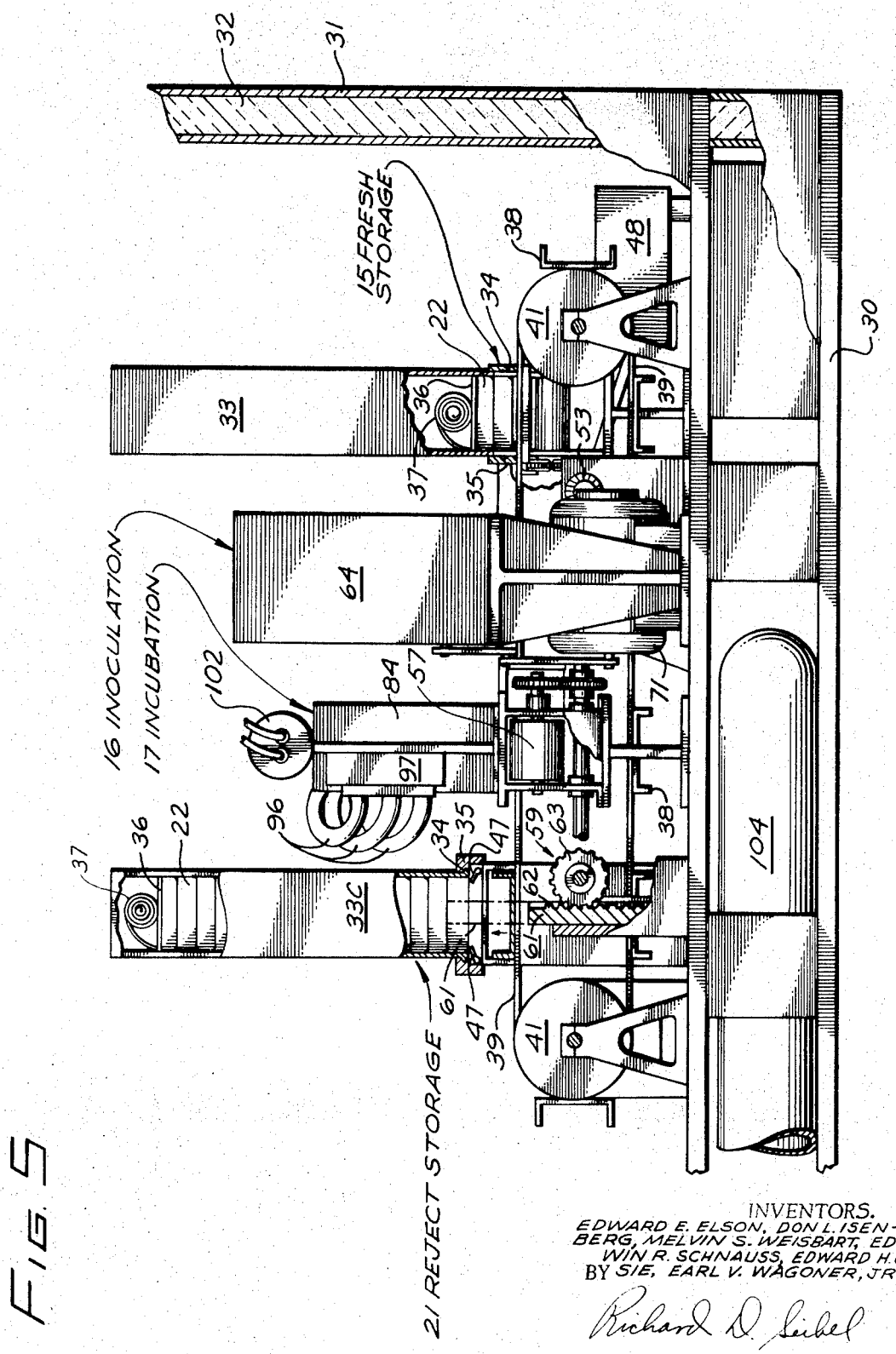
Figure 6:
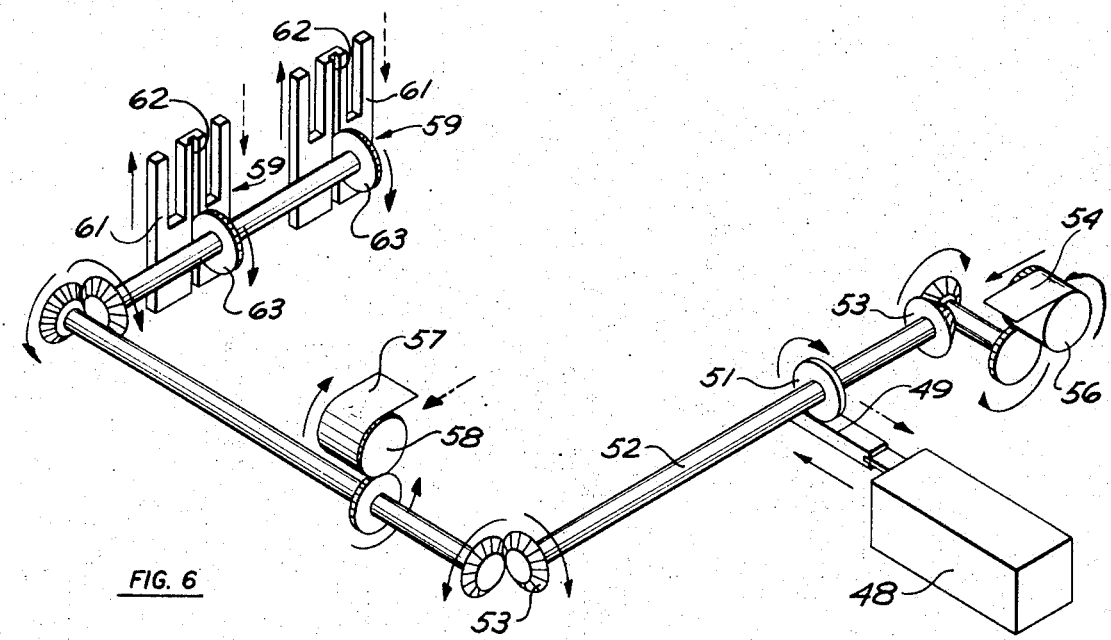
Figure 9:
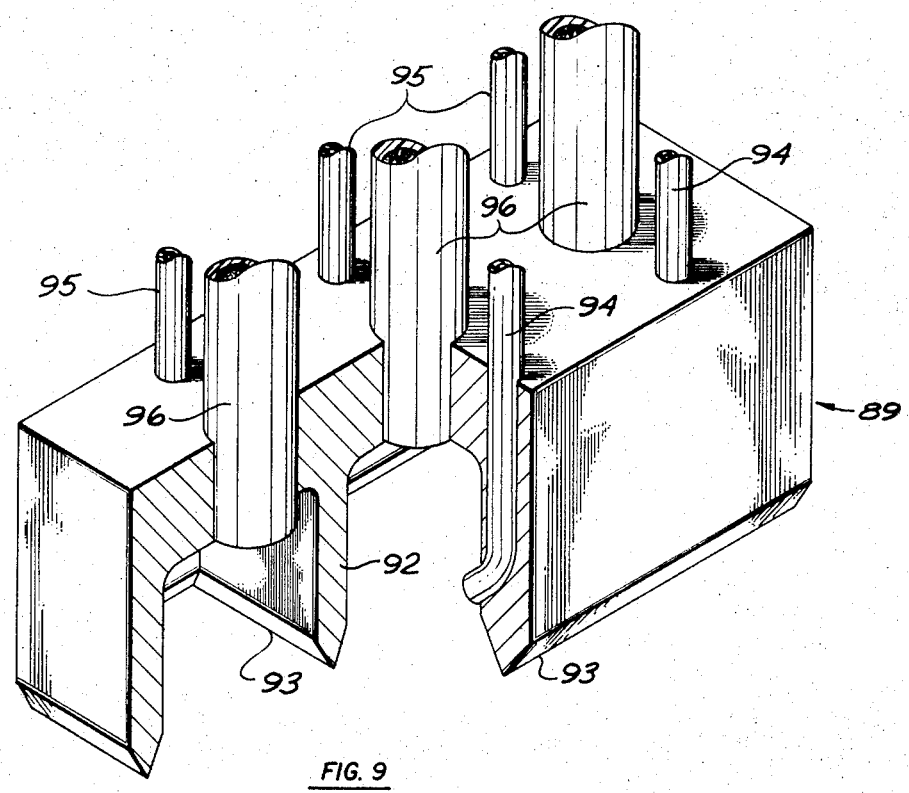

FIG. 5 comprises a side view of the apparatus of FIG. 1;

FIG. 6 shows schematically a mechanism for advancing the plate of FIG. 3 to the various stations of the apparatus of FIG. 1;

FIG. 7 illustrates a mechanism for automatically inoculating the plates of FIG. 3;

FIG. 8 provides a cross-section view of a portion of the apparatus of FIG. 1;

FIG. 9 illustrates, in perspective cutaway, an environmental housing for incubating and utilizing cultures of microorganisms;

FIG. 10 illustrates a preferred arrangement for photoelectrically monitoring light output from luminous cultures;

FIG. 11 illustrates in block form the gas flow and environmental control systems of the apparatus of FIG. 1;

FIG. 12 comprises an alternate arrangement of transport mechanism for an apparatus for growing and utilizing cultures of microorganisms;

FIG. 13 provides a side view of the transport mechanism of FIG. 12; and

FIG. 14 comprises a timing diagram for operation of a microorganism culture apparatus.

Throughout the drawings like reference numerals refer to like parts.

DESCRIPTION

FIG. 1 illustrates, in perspective cutaway, a microorganism culture apparatus incorporating the principles of this invention. The principal functional elements of the apparatus illustrates in perspective in FIG. 1 are outlined in block form in FIG. 2. Thus as illustrated in this embodiment there is provided a fresh vessel storage station 15 for storing a plurality of vessels of sterile nutrient medium as hereinafter described. As a first step in operation of the culture apparatus a vessel of nutrient (not shown in FIG. 1) is advanced to an inoculation station 16 wherein the nutrient medium in the vessel is inoculated with a relatively small number of microorganisms. The vessel is then advanced to an incubation station 17 wherein the environment is controlled for stimulating growth of a culture of microorganisms on the inoculated nutrient medium. After the culture is grown to an optimum stage it is advanced from the incubation station 17 to a utilization or exposure station 18 wherein in a preferred embodiment the luminous light output from the culture of microorganisms is monitored. After the useful life of the culture is expended in the exposure station 18 the vessel is advanced to a used vessel storage station 19 where it is temporarily stored for ultimate disposal.

During incubation of the microorganisms in the incubation station 17 the luminous light output is monitored and if culture growth is found to be unsatisfactory a vessel may be diverted to a rejected vessel storage station 21 as an alternate to utilization and a new vessel of nutrient medium may be inoculated and incubated to provide a fresh usable culture.

FIG. 3 illustrates a typical vessel 22 for storage and utilization of a sterile nutrient medium. As illustrated in this embodiment, there is provided an open faced housing of resilient or deformable material which is preferably opaque for minimizing interfering light in application of the vessel in conjunction with luminous microorganisms. The housing is in the form of a shallow dish having three compartments in which a nutrient medium 24 is provided. Three compartments are employed for redundancy and increased useful life in some circumstances. More or fewer compartments may be used as desired. The nutrient medium 24 is a conventional solid nutrient employed for growing cultures of microorganisms and is basically a gelatinous mixture of agar and nutrient materials suitable for the particular microorganisms being cultured. Typical luminous microorganisms and culture mediums therefore are described in the aforementioned U.S. Pat. 3,370,175.

The principal portion of the surface of the nutrient medium 24 is covered by a transparent membrane 26 adhesively bonded to the housing 23. The covering membrane has three apertures 27, each centrally located over one of the three compartments of nutrient medium in the housing. The openings in the membrane expose a portion of the nutrient medium 24 for growth of microorganisms as hereinafter described. The aperture effectively limits the area covered by the culture of aerobic organisms and limits the surface area of the nutrient medium exposed to conditions which may cause drying thereof. The membrane thus serves to reduce the surface to volume proportion of the nutrient medium in each compartment and assures that sufficient moisture is in the nutrient medium to support a culture thereon throughout its useful life as a detector of toxic materials.

In a preferred embodiment the culture vessels 22 are employed in a substantially horizontal orientation although it will be apparent that since the nutrient medium is solid other orientations may be employed. In this arrangement the bottom surface 28 of the resilient housing is a complement of the upper surface thereof so that pressure of the lower surface of one of the vessels 22 against the upper surface of another vessel seals the edges of the housing around the compartments in which the nutrient medium reposes, thereby preventing entry of unwanted microorganisms onto the nutrient medium of the lower vessel and preventing drying of the nutrient medium. This permits the fresh nutrient medium vessels to be stored in sterile conditions in the apparatus until withdrawn for utilization. It will be apparent that raised ridges or the like can be employed on the mating surfaces to effect higher contact pressures and further assure sealing. It will be apparent further that an adhesive can be applied to the upper surface of the nutrient vessel to assure a seal between it and the bottom surface of an adjacent vessel in storage.

Figure 4:
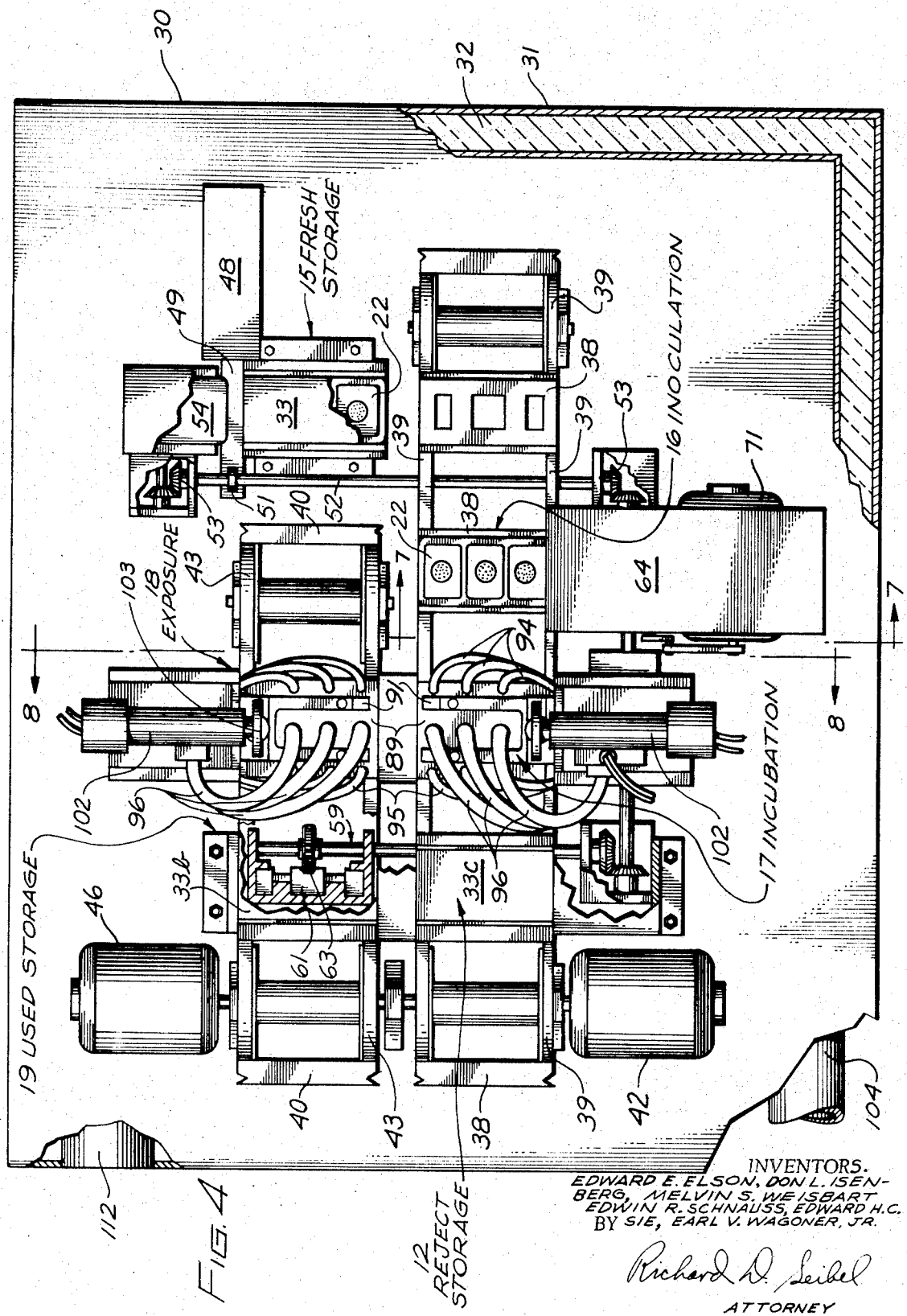
FIG. 4 illustrates a top view of the automatic apparatus of FIG. 1.

Referring again to the perspective view of FIG. 1 and also the top and side views of FIGS. 4 and 5, respectively, mechanical details of a culture apparatus as provided in the practice of this invention according to a preferred embodiment, are illustrated. The top view of FIG. 4 has the stations in the same relative locations as shown in the block diagram of FIG. 2. The apparatus so illustrated comprises a horizontal base 30 providing space therein for an environmental control system as hereinafter described in greater detail. Also contained within the base 30 are the electronic elements associated with the detection of toxic materials by luminous microorganisms in the described apparatus. Typical electronic circuitry for this purpose is described and illustrated in the aforementioned Pat. 3,370,175.

The electronics subsystem broadly comprises a photosensor, signal conditioner and associated alarm and display circuitry. Timing and actuation of mechanical elements of the mechanisms hereinafter described is also provided by conventional electrical control instruments.

A double walled housing 31 shown cutaway for purposes of illustration is mounted on the base 30 and includes thermal insulation 32 for helping maintain the interior of the apparatus at the optimum temperautre for growth of microorganisms. The various above mentioned stations and mechanical devices for operation thereof are mounted on the base 30 by several typical mounting

STORAGE STATION

A storage station 15 for sterile vessels of nutrient medium is the first element in the sequential series of elements provided in practice of this invention. The fresh vessel storage station 15 comprises an elongated rectangular housing or canister 33a open at one end. A slightly raised lip 34 adjacent the open end of the canister mates with a resilient detent 35, such as a grooved rubber "boot," for securing the canister 33a to the apparatus in use. Within the canister 33a a plurality of nutrient storage vessels 22 (FIG. 5) are provided with the bottom of each vessel resting on the top of the next lower vessel in order to provide sealing of the nutrient medium therein as hereinabove described in relation to FIG. 3.

A follower plate 36 is provided to top of the uppermost vessel 22 in the canister and a constant force follower spring 37 presses on the follower plate 36 to assure proper stacking and feeding of the nutrient vessels during extraction from the storage magazine 33a. The operation of the storage magazine is exactly similar to that used for rifle cartridges and the like. In a preferred embodiment sixteen nutrient storage vessels 22 are stored in the magazine so that for use at the rate of about one per day, two weeks of unattended operation is achieved. It will be apparent that greater number of nutrient storage vessels can be provided in each canister or a plurality of magazines can be employed for increasing the time of unattended operation.

TRANSPORT MECHANISM

In use of the apparatus individual nutrient vessels 22 are removed laterally from the bottom of the housing 33a by a retractable mechanism described hereinafter. A nutrient vessel stripped from the housing is transferred to a tray 38 (FIG. 4) which forms a portion of the transport mechanism for transporting the vessels to successive stations in the apparatus. The feeding motion breaks the seal between the top of the vessel being fed and the bottom of the one above it in the magazine. A plurality of trays 38 are arranged at equal increments on a pair of continuous belts 39 mounted on pulleys 41. These belts 39 pass along a series of stations in the apparatus for moving the trays 38 and nutrient vessels 22 thereon between successive stations of the apparatus. A stepping motor 42 drives a pulley 41 for advancing the belts 39 between successive stations. In order to provide proper sequential operation of the apparatus the trays 38 are arranged at equal increments along the belts 39 so that a single step advance of the motor 42 advances each tray to the next successive station in the sequence. By employing equal increments the complexity of drive mechanisms between successive stages is minimized. It will be apparent to one skilled in the art that in lieu of the pulley and belt arrangement shown that sprocket and chain drives or similar mechanisms can be employed for advancing the trays between successive stations.

After a nutrient vessel 22 is stripped from the fresh vessel storage magazine 33a onto a tray 38 the stepping motor 42 is advanced thereby advancing the tray and storage vessel to an inoculation station 16 where, in a single operation as hereinafter described in greater detail, a drop of liquid containing an appreciable number of viable luminous organisms is placed on the nutrient medium exposed in each of the apertures 27 of the nutrient vessel 22. The inoculation step requires only a brief time, normally less than a minute, and the nutrient vessel 22 is then advanced to the incubation station 17 by another stepping of the motor 42.

The incubation station 17 and the utilization or exposure station 18 (which is substantially identical thereto) are described in greater detail hereinafter. In the usual course of operation a nutrient vessel 22 is retained in the incubation station 17 for about one day and a suitable environment is provided therein for optimum growth of the culture of microorganisms inoculated on the nutrient medium at the inoculation station 16. After a suitable period of incubation the nutrient vessel (hidden in FIGS. 1, 4 and 5) is advanced laterally from the incubation station 17 to the exposure station 18. This lateral shift moves the nutrient vessel from a tray 38 on the belts 39 to a similar tray 40 on a second pair of belts 43 which are in turn mounted on pulleys 44, and hence the belts 43 are driven by a stepping motor 46 substantially identical to the stepping motor 42. The trays 40 are also spaced on the belts 43 in equal increments so that a single step of the motor 46 advances a tray and its associated nutrient vessel between successive stations in the apparatus.

In the usual course of operation of the apparatus the nutrient vessel 22 remains in the exposure station 18 for about one day for utilizing the culture of microorganisms thereon during the optimum portion of its lifetime. After this period the steping motor 46 is advanced one step thereby moving the tray 40 and the nutrient vessel 22 to the station 19 where the used vessels are stored.

Storage of the used nutrient vessels is in a housing, magazine, or canister 33b identical to the housing 33a for storing fresh nutrient vessels, including a follower plate 36 and constant force spring 37 for proper stacking of the nutrient vessels. During the normal course of operation of an apparatus as described herein a magazine 33b filled with used nutrient vessels is removed and discarded and the empty magazine from the fresh vessel storage station is placed at the used storage station for receipt of nutrient vessels from a new magazine placed at the fresh vessel storage station.

After a nutrient vessel is advanced from the exposure station 18 to the used vessel storage station 19 it is pressed upwardly as hereinafter described in relation to FIG. 6 into the storage magazine 33b where it is retained by spring loaded pawls 47.

During incubation of cultures of microorganisms in the incubation station 17 the luminous light output of the culture is monitored and if it is detected that culture growth is inadequate or otherwise anomalous after a portion of the incubation period, the nutrient vessel having that culture may be rejected and a new culture vessel inoculated and incubated to take its place in the cycle of operation of the apparatus. Since three cultures are grown simultaneously a vessel may be retained if only one is anomalous, or it may be rejected when one is anomalous, as preferred. If a culture vessel is rejected in the incubation station the stepping motor 42 is advanced thereby moving a tray 38 and the nutrient vessel therein from the incubation station 17 to the rejected vessel storage station 21. This station comprises a storage magazine 33c in all respects identical with the storage magazine 33b for used nutrient vessels, and the rejected vessel is elevated in the same manner as in the used vessel storage station 19.

FIG. 6 illustrates in schematic form a mechanism for advancing nutrient vessels from station to station in the apparatus. Many of the elements of this advancing mechanism are also visible in the FIGS. 1, 4 and 5, however, FIG. 6 illustrates the concurrent operation of the various advancing mechanisms without obstruction from other elements of the apparatus illustrated in these figures. In this subsystem a conventional linear actuator 48 has a friction member or rack face 49 thereon which advances as indicated by the solid arrow upon energization and retracts as indicated by the dashed arrow upon deenergization. The friction member or rack 49 operates a drive wheel or pinion gear 51 which is connected to a shaft 52 so that actuation of the linear actuator causes a selected degree of shaft rotation which is promptly reversed and the system connected to the shaft is returned to its initial position.

At the ends of the shaft 52 are bevel gears 53 for transmitting the shaft rotation to various devices and various rotary to linear motion converters for advancing nutrient vessels (not shown in FIG. 6) from one station to another. Thus at the fresh vessel storage station a pusher is provided for advancing a fresh vessel from the magazine to a tray on the belt (FIG. 4). In a preferred embodiment the pusher comprises a flat strip 54 wound about a drum 56 so that rotation of the drum, as driven by a gear train from the linear actuator 48, causes the end of the strip 54 to be unwound from the drum and advance linearly in a manner analogous to a steel tape measure. This linear advance provides a pushing force for transferring nutrient vessels.

In the same manner a pusher, comprising a strip 57 and a drum 58, is advanced by the gear train for transferring a nutrient vessel from the incubation station to the exposure station.

Further along the rotatable driving mechanism illustrated in FIG. 6 are a pair of elevator mechanisms 59 each comprising a trifurcated pusher member 61 having a rack face 62 meshing with a pinion gear 63 so that forward actuation of the mechanism raises the two pusher members at the same time as the strips 54 and 57 are advanced. The two elevator mechanisms 59 pass the pushers 61 upwardly through trays 38 and 40 (not shown in FIG. 6) to lift a nutrient vessel thereon into a storage magazine. Two such elevator mechanisms 59 are provided, one each for the used vessel storage station, and the reject storage station, respectively.

Thus upon actuation of the linear actuator 48 the pusher strip 54 advances, shifting a nutrient vessel laterally from the fresh vessel storage station to a tray 38 on the belt 39. Simultaneously the pusher strip 57 advances and if a nutrient vessel is in the incubation station it is advanced laterally to the exposure station. Also simultaneously, the elevator mechanisms 59 are advanced and if a nutrient vessel is in either the reject or used vessel storage station, it is raised into the respective magazine. It will be apparent that upon each stroking of the linear actuator a nutrient vessel is stripped from the fresh vessel storage magazine and commenced on the cycle of operation. Movement of a nutrient vessel at the other stations operably connected with the actuating mechanism of FIG. 6 depends on the presence of a nutrient vessel at the particular station and in some portions of operation of the culture apparatus, as pointed out hereinafter, no nutrient vessel may be present at any particular station.

INOCULATION STATION

After a nutrient vessel is advanced from the fresh vessel storage station to a tray 38 it is next advanced to the inoculation station 16. Up to this point the nutrient medium is sterile and no microorganisms are growing thereon. In order to grow suitable luminous microorganisms the surface of the nutrient medium is inoculated with a drop of liquid containing a suspension of viable microorganisms which, upon further incubation, develop into a suitable size culture for utilization in the culture apparatus.

Inoculation of the nutrient medium is provided in a preferred embodiment by an inoculation mechanism such as is illustrated in cutaway in FIG. 7. As illustrated in this embodiment there is provided a housing 64 lined with thermal insulating material 66 so that the interior of the housing can be maintained at a low temperature for maintaining viable organisms without undue growth thereof. Within the housing there is provided a shallow dish 67 in which liquid may stand. An inverted vial 68 of nutrient liquid having suspended therein luminous microorganisms is provided for maintaining a constant level of liquid in the shallow dish 67. In a preferred embodiment the inoculum reservoir contains about ten milliliters of a culture of luminescent microorganisms which is sufficient for operation for over one month without attention. Only about 0.3 milliliter of resting cell suspension is required for full 30 day operation, however, an excess is preferably employed for maximum reliability. In a preferred embodiment the vial is filled in the field with lyophylized cells or dried spores plus a small amount of sterile water. The lyophylized cells have an indefinite shelf life and after mixing with water are readily maintained in the apparatus for a month or more. The refrigerated housing is preferably maintained at about 37° F. for maintaining the resting cell culture.

An inoculation mechanism is provided for withdrawing fractions of the organisms from the shallow dish 67 and placing these fractions on the surface of the three exposed regions of the nutrient medium in a nutrient vessel 22. Broadly, a motor driven parallel bar arrangement is employed for transferring drops of inoculum liquid to the nutrient medium. In this arrangement a crank arm 69 on a motor 71 causes a connecting rod 72 connected thereto to oscillate between two positions one of which is shown solid in FIG. 7 and the other of which is shown in phantom. The other end of the connecting rod 72 is in turn connected to a crank 73 all of which is located outside of the housing 64 (FIG. 1). In FIG. 7 a side of the housing 64 has been cut away to better illustrate the operating mechanisms within the housing. The other end of the crank 73 is rigidly connected to a first parallel bar 74 at a first fixed pivot 75 so that the crank and first parallel bar 74 operate in the manner of a bell crank. The other end of the first parallel bar 74 and a second parallel bar 76 are each connected to a probe supporting bracket 77 at spaced-apart pivot points 78. The second parallel bar 76 is mounted behind the first parallel bar 74 to permit proper clearance as the bars pivot. The other end of the second parallel bar 76 is connected to a fixed pivot point 79 which is spaced horizontally from the fixed pivot 75 at the same distance as the two pivots 78 on the probe supporting bracket 77, thus forming a parallelogram in which two sides are the parallel bars 74 and 76, a third side is between the horizontally spaced apart fixed pivot points 75 and 79, and the fourth side is the bracket 77 between the pivot points 78. Thus throughout the full cycle of motion the parallel bars 74 and 76 remained parallel and the probe supporting bracket 77 remains in a horizontal orientation.

Three probes or fingers 81 are provided on the probe supporting bracket 77 for holding drops of inoculum for transfer from the shallow dish 67 to the nutrient medium 24. During one position of rotation of the motor 71 the described linkage holds the probe supporting bracket 77 in a position over the shallow dish 67 as illustrated in phantom in FIG. 7 and dips the ends of the probes 81 into inoculum in the dish. Rotation of the motor then swings the probes somewhat upwardly and thence outwardly from the dish so that a cam 82 on the second parallel bar 76 opens a spring loaded, insulated door 83 on the housing 64. The parallel arms then continue to swing outwardly and downwardly about the fixed pivots 75 and 79, bringing the vertical probes 81 into a position just contacting the surface of the nutrient medium 24 in a nutrient vessel 22 as shown solid in FIG. 7.

Continued rotation of the motor reverses the oscillation of the connecting rod 72 thereby reversing motion of the bell crank connected bars 73, 74. This raises the probes from the surface of the nutrient medium and withdraws the parallel bar arrangement and probes within the housing 64 and permits the door 83 to close. Rotation of the motor is, in a preferred embodiment stopped, at a point where the probes 81 are just within or slightly above the surface of the inoculum in the dish 67.

Thus the cycle of operation of the inoculating mechanism is to first dip the probes 81 into the inoculum in the dish 67 and upon withdrawal a small drop of inoculum having luminous microorganisms therein is withdrawn on the end of each of the probes 81. The size of the drop of inoculum depends upon the geometry of the probe but in a preferred embodiment is approximately 0.001 cubic centimeter. When the probe is brought into contact with the surface of the nutrient medium 24 a substantial portion of the drop thereon is transferred to the moist surface of the agar, thereby transferring an inoculum of microorganisms to the nutrient surface for growth of a culture thereon.

In an alternative arrangement the inoculation can be with organisms from a growing culture, such as from the incubation station, rather than resting cells as provided in the preferred embodiment. In such an arrangement a small volume of culture is cut or scraped from the surface of an incubated colony of microorganisms and placed on the surface of a sterile nutrient medium. This may be advantageous in some circumstances since the growing microorganisms of an incubated culture is ready for use within about three hours. A culture incubated from a resting cell suspension may take from 8–12 hours to be grown to a point where it is useful for detection. With this alternative arrangement the cultures or successive vessels are serial propagations of the original culture rather than parallel as in the preferred embodiment. This is not found to be a significant factor, however, since serial propagations for as much as six months of operation are highly unlikely to introduce any strains or contaminations that degrade performance.

It will also be apparent that other inoculation techniques can be employed such as inoculum liquid in a syringe, a paste of nutrient with microorganisms or the like.

INCUBATION AND EXPOSURE STATIONS

After a brief stop at the inoculation station 16 (normally less than a minute) the inoculated nutrient vessel is advanced to the incubation station 17 by advancing the stepping motor 42. The incubation station broadly comprises a chamber for enclosing the growing cultures on the nutrient medium, means for raising and lowering the chamber, means for introducing gases into the chamber to provide a controlled environment, and means for monitoring the light output of cultures growing therein. Additional details concerning the incubation chamber are set forth hereinafter.

After the cultures on a nutrient vessel are incubated and grown to an optimum condition the nutrient vessel is advanced to a utilization or exposure station 18 as hereinabove described. The exposure station is substantially identical to the incubation station and a single description is provided herein of these two allochiral elements.

The exposure and incubation stations are illustrated in FIGS. 1, 4 and 5 and more particularly in the cross section side view of FIG. 8. As illustrated in this embodiment each station comprises a stand 84 on the instrument base 30 for supporting the mechanical elements of the station. A sleeve 86 on the stand 85 provides sliding support for a rod 87 which is urged upwardly by a compression spring 88. An environmental housing 89 is mounted at the lower end of the rod 87, and an arm 91 on the rod 87 is spring loaded against the environmental housing 89 for urging it downwardly against a nutrient vessel (hidden in FIG. 8) in a tray 38 or 40 for providing a seal.

Broadly the environmental housing provides a light-tight environment for the culture of microorganisms; at least two gas ports, one for entry and the other for exhaust; and means for exposing a photosensor to light emitted by the culture. A typical environmental housing 89 is illustrated in somewhat greater detail in perspective cutaway view of FIG. 9. As illustrated in this embodiment the environmental housing comprises a rigid, open faced box having two webs 92 thereacross dividing the interior of the box into three separate compartments. The lower edge of the webs 92 and the periphery of the housing 89 terminates in a knife edge 93 all around the open face of the housing so that pressure of the environmental housing against a resilient nutrient vessel 22 (FIG. 3, not shown in FIG. 9) provides a seal separating each of the internal compartments from each other and from the outside environment, thereby isolating the cultures of luminous microorganisms.

A pair of fluid conduits 94 and 95 are provided into each of the compartments in the environmental housing. One of the conduits 94 is employed for introducing air into the compartment and the other conduit 95 is for removing air from the compartment, either for providing a controlled environment for optimum growth of a culture of microorganisms in the incubation station or for selective exposure of the cultures to possible toxic materials in the utilization station. The conduits, cut off for convenience of illustration, extend to the environmental control system hereinafter described. A fiber optic light pipe 96 is also provided through the environmental housing 89 for each compartment so that light emitted by cultures of luminous organisms is collected and conducted to a photodetector. The light pipes 96 are flexible bundles of totally internally reflecting glass filaments as are readily available.

A suitable photodetector arrangement is illustrated in greater detail in the perspective cutaway view of FIG. 10. As illustrated in this embodiment the other ends of the light pipes 96 are terminated just exteriorly of a housing 97 within which a conventional photomultiplier tube 98 is arranged. It will be apparent that phototransistors, photodiodes, photovoltaic cells and the like can be employed as desired to obtain a selected sensitivity and spectral response. Between the ends of the fiber optic light pipes 96 and the photomultiplier tube 98 a motor driven shutter 99 is provided so that in any shutter position two of the light pipe ends are blocked. An aperture 101 in the shutter exposes the end of one of the light pipes 96 to the photomultiplier tube so that light output from a culture of luminous microorganisms in one chamber of the environmental housing can be monitored at a time. In this way one of the three cultures on a nutrient vessel is utilized at a given instant of time and the other two cultures are in reserve or have already been used.

Referring again to FIG. 8, a motor 102 is mounted on the top of the stand 84 and an eccentric cam 103 is provided on the output shaft thereof. The cam 103 acts on the end of the rod 87 for forcing the environmental housing 89 downwardly against a nutrient vessel. Upon rotation of the motor and cam from its lowermost position, the rod 87 is urged upwardly by the spring 88 thereby lifting the environmental housing 89 from the surface of a nutrient vessel. Lifting of the environmental housing is provided whenever it is desired to move a nutrient vessel from one station to another. It will be apparent that in lieu of the described cam arrangement that solenoid actuators, lever systems and the like may be employed for lifting the environmental housings.

ENVIRONMENTAL CONTROL

In order to provide optimum incubation and growth conditions for microorganisms and to provide means for sampling an environment, an environmental control system is provided in the culture apparatus. A preferred environmental control system is illustrated in block form in FIG. 11. All of the elements of the environmental control system are conventional items and only their interrelationship is illustrated in the block diagram. As illustrated in this embodiment there is provided an air inlet 104 to the case 31 of the culture apparatus. An induction fan 106 on the inlet line maintains the pressure inside the case above ambient pressure for maintaining a purified atmosphere within the case and also provides a supply of air for use in the incubation and exposure stations of the apparatus, and further, the induction fan 106 provides a supply of air to be sampled for the presence of toxic materials in the exposure station.

The inlet fan 106 moves ambient air through a particulate filter 107 wherein solid particles are removed from the air. A portion of the air leaving the particulate filter 107 passes through a chemical filter 108 and is then mixed with the air in the apparatus case by a high volume circulation fan 109. If desired a bacterial filter can be employed, however, this is not normally needed since airborne organisms seldom grow on the usual culture media of luminous microorganisms. The chemical filter comprises a conventional gas mask canister containing activated charcoal and the like for removing possible toxic materials from the ambient air to make it suitable for life support of the microorganisms in the incubation and exposure chambers.

The remainder of the ambient air from the particulate filler is passed via plenum 111 to an exhaust port 112. An orifice 113 in the plenum 111 serves to create a pressure differential therein which maintains the proper supply and exhaust flow directions within the plenum. A small portion of the unfiltered ambient air may be sampled as hereinafter described for exposure of organisms in the utilization station for detection of possible toxic materials.

The circulating fan 109 moves air within the case 31 across the coils of a combination refrigeration and heating heat exchanger 114 which serves to heat or cool the air as required to maintain the temperature within the case at about 68° F. which is found to be an optimum temperature for growth of microorganisms. A conventional temperature sensor 116 monitors air temperature and controls operation of the heat exchanger by way of a conventional signal conditioner and control system 117.

In order to provide properly conditioned air for the cultures of microorganisms a conditioning plenum 118 is provided having a humidity sensor 119. For optimum growth the microorganisms require a relative humidity in excess of about 60%. If the humidity sensor detects a relative humidity lower than this acceptable value the control system 117 activates a heat exchanger 121 for vaporizing water 122 and raising the relative humidity. A portion of the conditioned air from the plenum 118 passes through a solenoid valve 123 and thence via fluid conduits 94 to the three incubation chambers of the environmental housing 89. Only about five cubic centimeters of air per hour is required for each of the incubation chambers. After air passes through the incubation chambers it is removed by the conduits 95 and exhausted from the system through a check valve 124.

Another portion of the air from the conditioning plenum is supplied to each of three solenoids valves 126 which permit air to flow to the individual exposure chambers of the environmental housing 89 in the utilization station of the apparatus. The valves 126 are two-way valves so that air can alternatively be supplied from the unfiltered air plenum 111 for exposure of a culture of microorganisms in one of the exposure chambers to air containing possible toxic materials. A sample flow rate of about five milliliters per second is found suitable. Air from each of the exposure chambers is exhausted out of the apparatus by way of one of check valves 127. In the normal course of operation the three valves 126 are positioned so that two of the chambers in the exposure station are exposed to conditioned air from the plenum 118 and one chamber is monitoring ambient air from the plenum 111 for the presence of toxic materials.

In a preferred mode of operation the valve 126A to the chamber being used is repetitively cycled between the sampling air plenum 111 and the conditioning plenum 118. Thus the culture is alternately exposed to air suspected of containing a toxicant and clean, humidified air for purging any toxicity in the chamber and reconditioning the culture. This also serves to minimize the effects on light output of the temperature and humidity of the sampled air. Provision can also be made for providing conditioned air to the exposed culture immediately after a toxic material is detected for quickly purging the toxicant and minimizing damage to the culture. Other modes of operation are also acceptable including various permutations of continuous and intermittent sampling and continuous and intermittent purging. In the embodiment described and illustrated the plenum 111 is inside the case and therefore exposed to an environment of 68° F. This tends to bring the sample air toward that temperature and minimize temperature effects on the culture. If desired the sample air can be deliberately pre-conditioned before exposing the culture by heating or cooling as required and raising of the relative humidity, if needed. These prolong the useful life of the culture but increase the delay time between actual presence of a toxicant outside the detector and detection thereof.

The environmental control system also maintains the temperature of the inoculum storage housing 64 at about 37° F. in order to maintain stored organisms viable but with minimum growth. A temperature sensor 128 monitors this temperature and provides signals to the control system 117 for activating a heat exchanger 129 as required to separately refrigerate the store of inoculum. In addition, a small amount of conditioned air is fed to the inoculum store by a conduit 131 for maintaining the aerobic microorganisms.

The valves 123 and 126 are automatically programmed by the control system of the apparatus (not shown) to be closed when the environmental housings 89 are raised for changing cultures of microorganisms. This is not essential except that the valves 126 should be closed to prevent possible induction of toxic materials from ambient air into the instrument case. It is also desirable to deliberately purge the exposure chambers just before raising of the housing to eliminate any toxicants therein.

OPERATION

In order to commence operation of a microorganism culture apparatus as described, various expendables are supplied to the system so that it can be left unattended for a substantial period of time. If the system is battery operated the batteries are recharged or replaced; water is added to the environmental control system; and a vial of liquid containing a suspension of microorganisms is placed in the inoculation station. A magazine of sterile nutrient vessels is placed at the fresh vessel storage station 15 and empty magazines for receipt of nutrient vessels are placed at the used vessel storage station 19 and the reject storage station 21. The apparatus is then ready for continuous unattended operation for so long a period as the expendables last.

The first cycle of automatic operation is to extract a nutrient vessel 22 from the magazine 33a at the fresh vessel storage station 15. This is accomplished by activating the linear actuator 48 whereupon the pusher strip 54 pushes the bottom nutrient vessel 22 into a tray 38 on the belts 39. The stepping motor 42 is then advanced one step bringing the tray and nutrient vessel to the inoculation station. The motor 71 is then operated through one full revolution thereby swinging the probes 81 from the inoculum housing 64 and providing a drop of microorganism containing inoculum on each of the apertures 27 in the upper surface of a nutrient vessel.

After inoculation the stepping motor 42 is advanced one step while the cam 103 on the incubation station is in a position permitting the environmental housing 89 to be in a raised position. This brings the nutrient vessel into the incubation station 17 and then the cam 103 is rotated to bring the environmental housing 89 into sealing relation with the upper surface of the nutrient vessel. The valve 123 is then opened to permit conditioned air at about 68° F. to slowly pass through the incubation chambers thereby providing optimum growth conditions for a culture of luminous microorganisms on the nutrient medium 24. Growth in the incubation chamber continues for about one day and during this time luminous light output from the cultures is monitored by the photomultiplier 98 to verify that optimum growth is occurring.

If it should be detected that optimum growth is not occurring the environmental housing 89 at the incubation station is raised and the stepping motor 42 advanced one step thereby bringing the rejected nutrient vessel 22 into position in the rejected storage station 21. Activation of the linear actuator 48 then simultaneously extracts a new nutrient vessel 22 from the storage magazine at the fresh vessel storage station 15 and the elevator 59 at the reject station 21 presses the rejected nutrient vessel into the storage magazine 33c. The fresh nutrient vessel is then inoculated and incubated as hereinabove described.

In the normal course of operation after one day of incubation the environmental housing 89 on both the incubation and exposure stations 17 and 18, respectively, are raised and the linear actuator 48 is activated. This extracts a new nutrient vessel from the magazine and simultaneously transfers the incubated nutrient vessel from the incubation station 17 to the exposure station 18 by means of the pusher strip 57. The environmental housing 89 on the exposure station is then lowered and one of the valves 126 opened thereby exposing one of the cultures of microorganisms to ambient air which may contain a toxic material from the plenum 111. The aperture 101 in the shutter 99 is positioned in front of the appropriate light pipe 96 so that the luminous light output from the exposed culture of microorganisms is monitored for sharp changes in light output which would signal the presence of a toxic material.

The fresh nutrient vessel 22 stripped from the magazine 33a is inoculated and incubated as hereinabove described.

The microorganisms employed for detection of toxic materials have a useful lifetime of about one day and three such cultures are simultaneously arranged in the exposure station with each of the three normally employed for about eight hours. The extra cultures thus provided permit the apparatus to be utilized for an extra period in case an incubating culture is rejected and a new one must be started and also provides for continued operation after one or more of the cultures in the exposure station is rendered useless due to actual exposure to a toxic material. This provides a measure of redundancy and more can be provided merely by using a larger number of cultures per vessel.

In the normal course of operations after about one day of utilization in the exposure station 18 the used culture is passed to the used vessel storage station 19 by raising the environmental housing 89 at the exposure station and advancing the stepping motor 46, thereby passing a tray 40 and the used nutrient vessel 22 to the used vessel storage station. The environmental housing 89 at the incubation station 17 is also raised and the linear actuator 48 is activated so that three simultaneous operations occur: a sterile nutrient vessel is stripped from the fresh vessel station 15; an incubated nutrient vessel is shifted from the incubation station 17 to the exposure station 18 and the elevator 59 presses the used nutrient vessel into the magazine 33b at the used vessel storage station 19. The environmental housing 89 on the incubation station and the environmental housing 89 on the exposure station are then lowered and inoculation and incubation of the fresh nutrient vessel is provided as hereinabove described and exposure of a culture to ambient air is provided in the utilization station.

An alternative way of envisioning the operation of the automatic culture apparatus is by way of a timing diagram or synchrogrgaph showing the several operations which are occurring in the apparatus and the relative timing thereof. Such a timing diagram is provided in FIG. 14 wherein the sequences of operations are presented in schematic form without any definite time scale. Thus, for example, the time interval between successive events may be very short, but in FIG. 14 is illustrated as of substantially the same duration as the events themselves. Similarly, cycling of valves for sampling an atmosphere suspected of containing foreign material occurs in intervals of seconds whereas the position of a shutter may remain unchanged for eight hours. However, both of these events are shown on the same time axis in FIG. 14 without being drawn to the same scale.

In the timing diagram of FIG. 14 it is assumed at the commencement that the apparatus is in operating condition with nutrient vessels in the incubation and exposure stations. It will be apparent that the operations required to start up the apparatus are merely selected ones of the operations required for continued operation of the apparatus and do not differ in kind or sequence. Thus, in the usual course of operation as illustrated in the left hand portion of FIG. 14 the sampling valves 126A and 126B are passing clean humidified air over cultures in the exposure station of the apparatus, as shown on lines 14b and 14c.

The sampling valve 126C as illustrated on line 14d is cycling between the position wherein clean air is passed over a culture in the exposure chamber and the position wherein air being sampled for presence of a toxic material is passed over the same culture. Thus the third culture in the nutrient vessel is being employed for sampling the environment while the first and second cultures are in a standby condition. During this same time the shutter 99 on the exposure station is in the third or C position as shown on line 14*l* so that the photomultiplier is monitoring the light output from the same culture that is sampling the environment.

During this same time the valve 123 is open as shown on line 14*g* so as to pass clean humidified air over the cultures in the incubation station and the shutter 99 on the incubation station is periodically cycling as shown on line 14*m* so that the light output from the cultures in the three positions of the nutrient vessel are sequentially sampled to detect any anomalous growth of the cultures. This continual sampling of light output from the incubating cultures continues throughout operation of the apparatus with the time intervals and cycling rates being any convenient value such as 10 minutes or the like.

At some point when the cultures in the exposure station have served their programmed time or are otherwise depleted the automatic culture apparatus is cycled to introduce a new culture in the exposure station. The first change made is to disable the alarm of the apparatus as illustrated in line 14*a* so that the removal of the culture from the exposure chamber will not be falsely interpreted as a diminution of light intensity due to exposure to some toxic material. When the alarm is disabled the sampling valves 126A, 126B and 126C are closed as shown on lines 14*b*, 14*c*, and 14*d* respectively, to minimize use of humidified air and to prevent possible induction of toxic materials into the equipment case. It will be apparent, that if desired, the valves can be left in the clean air position since the time interval for changing of nutrient vessels is relatively short.

After the valves 126 are cycled so as to prevent sample air from being induced into the apparatus the housing motor 102 on the exposure station is energized so that the environmental housing is raised as illustrated in line 14*e*, and the seal to the nutrient vessel is broken. After the housing is elevated the motor 46 driving the belt between the exposure station and the used vessel storage station is activated to advance the tray and the nutrient vessel therein between these stations as illustrated in line 14*f* thereby clearing the exposure station for receipt of another nutrient vessel. At about the same time the valve 123 on the incubation chamber is closed as shown on line 14*g* to minimize use of humidified air and shortly thereafter the motor 102 on the incubation chamber is activated to elevate the environmental housing as shown on line 14h.

With both environmental housings raised the advancing linear actuator 48 is activated as illustrated on line 14i. The actuator moves the various mechanisms illustrated in FIG. 6 and thereby performs several simultaneous functions: a fresh nutrient vessel is stripped from the new vessel storage station and commenced in the cycle of utilization; the nutrient vessel in the incubation station is advanced to the exposure station; and the nutrient vessel at the used vessel storage station is pressed upward into the storage magazine.

As soon as the new nutrient vessel is advanced to the exposure station the housing motor 102 brings the environmetal housing down into contact with the surface of the nutrient vessel as illustrated in line 14e. The sampling valves 126B and 126C are opened to pass clean humidified air over the cultures in the second and third positions of the nutrient vessel and the sample valve 126A is started on a series of repetitive cycles between a position where clean air is passed over the culture and sample air is passed over the culture as illustrated on line 14*b*. Since the first culture on the nutrient vessel is now being employed for sampling, the shutter 99 on the exposure station is switched to the corresponding position as shown on line 14*l* so that the light output from the first culture is exposed to the photomultiplier tube.

Also, after the actuator 48 has cycled, the motor 42 on the belt between the inoculation and incubation stations advances one step to bring the fresh nutrient vessel to the inoculation station as illustrated on line 14*j*. When the sterile nutrient medium is in position before the inoculation station the motor 71 thereon is activated as shown in line 14*k* so that the inoculation apparatus places a drop of microorganism-containing media on the nutrient for subsequent incubation. After the inoculation is completed the motor 42 on the belt again advances one step as shown on line 14*j* and brings the inoculated nutrient vessel to the incubation station. The motor 102 then lowers the environmental housing onto the inoculated nutrient vessel as illustrated on line 14*h* and the valve 123 is opened as shown on line 14*g* to provide clean humidified air to the incubating cultures, and the vessel charging cycle is completed.

After some time interval, such as eight hours, the culture in the first or A position in the exposure station may be depleted due to its normal growth cycle or due to exposure to toxic material. At such time the sample valve 126A is cycled to a clean air position and the sample valve 126B is cycled to an operating condition where it is periodically switched from a clean air position to a sample air position in substantially the same manner as the valve 126A had previously been operated. At the same time the shutter 99 on the exposure station is changed from position A to position B as shown on line 14*l* so that the photomultiplier is monitoring the light output of the culture in the B position.

Further to the right in the diagram of FIG. 14 it is assumed that one or more of the cultures in the incubation station shows anomalous growth and it is necessary or desirable to reject this nutrient vessel and commence another in the cycle of operation. As will be apparent from examination of the diagram of FIG. 14 the operation of the sampling and exposure station of the apparatus is unaffected by this rejection from the incubation station.

The first operation in vessel rejection is to close the valve 123 passing clean air to the cultures in the incubation station as shown on line 14*g*. The motor 102 in the incubation station is then activated as shown on line 14*h* to raise the environmental housing from the nutrient vessel whereupon the motor 42 driving the belt is advanced one step as indicated on line 14*j* to advance the nutrient vessel from the incubation station to the reject station. When this is completed the actuator 48 is activated as on line 14*i* which simultaneously strips a new sterile nutrient vessel from the storage magazine and presses the rejected nutrient vessel into the reject storage magazine. Since there is no nutrient vessel in the incubation station at this time there is no advance to the exposure station. The motor 42 then advances a single step as indicated on line 14*j* bringing the sterile nutrient vessel to the inoculation station whereupon the motor 71 is activated as indicated on line 14*k* for inoculating the nutrient vessel. After inoculation the motor 42 is again activated for one step advancing the inoculated nutrient vessel to the incubation station. As soon as the vessel is in position in the incubation station, the motor 102 is activated to lower the environmental housing as illustrated in line 14*h* and the valve 123 is again opened as indicated on line 14*g* to pass clean humidified air over the cultures in the incubation station.

It will be apparent that any conventional control arrangement can be employed to sequence the above outlined events. Thus, for example, a rotating drum can operate switches to program the apparatus, or preferably electronic switches, timers and interlocks can be employed to control the cycling of the transport apparatus.

The above described embodiment has been described for operation with a one day cycle at the incubation and utilization stations. This time is considered optimum for utilization of the microorganisms at the proper point in their life span, however, other periods can be used. Thus, it is found that the lyophilized or resting cell microorganisms about 4 to 12 hours of incubation is sufficient to provide an adequate sensing level. Similarly, a culture is useful as a sensor for 48 to 72 hours (and sometimes up to seven days). The selection of normal incubation and utilization times of about one day permits acceleration of incubation or delay in the exposure station in case of rejected cultures or destruction of cultures due to toxic materials.

ALTERNATIVE ARRANGEMENT

Although a preferred embodiment of a microorganism culture apparatus has been described and illustrated hereinabove other arrangements for transporting vessels of nutrient medium can readily be provided. Such an arrangement is illustrated in the alternative arrangement of FIGS. 12 and 13. As illustrated in this embodiment the vessels of nutrient medium are stored and transported by means of circular rings as hereinafter described. In a preferred embodiment this apparatus comprises a base 132 having space therein for an environmental control system substantially the same as hereinabove described in relation to a preferred embodiment. A thermally insulated housing 133 is provided around the apparatus to help provide temperature control therein for optimum culture growing conditions.

Within the housing there is provided an inoculation station 134 for inoculating a nutrient vessel 135 substantially identical to the vessel 22 hereinabove described. The inoculating mechanism 134 provides means for transferring three drops of microorganism containing inoculum from a refrigerated housing onto the surface of three areas of nutrient medium exposed on a nutrient vessel, and in a preferred embodiment comprises a mechanism substantially the same as hereinabove described and illustrated in FIG. 7. Adjacent the inoculation station 134 there is provided an incubation station 136 which, in a preferred embodiment, is substantially identical to the incubation station 17 hereinabove described and illustrated in a preferred embodiment. In the alternative arrangement of FIGS. 12 and 13 there is also provided an exposure station 137 which is preferably substantially identical to the incubation station 136 and the exposure station 18 hereinabove described and illustrated in a preferred embodiment.

In this alternative embodiment there is also provided a transport mechanism for transporting nutrient vessels from one station to another in the apparatus. In this arrangement the storage of fresh, sterile nutrient vessels, used nutrient vessels, and rejected nutrient vessels are all combined with the transport mechanism. Thus fresh nutrient vessels 135 are arranged on the upper surface of a flat outer ring 138 with the several nutrient vessels spaced apart at equal increments on the ring. In the storage arrangement provided in this embodiment, however, the storage vessels are arranged in generally side to side relation rather than in a position where the bottom of one vessel seals against the top of an adjacent vessel. It is desirable, however, to seal the open face of the nutrient vessel to maintain sterility and prevent drying of the nutrient medium, therefore, a curved strip of plastic tape or foil 140 is provided over the tops of the nutrient vessels 135 and as the outer ring 138 rotates in the direction shown by the arrow for advancing nutrient vessels from one station to another the strip of plastic or foil is wrapped onto a conical roller 139 thereby exposing the nutrient surface. A large diameter ring gear 141 is provided on the bottom surface of the outer ring 138 for rotating the outer ring as hereinafter described.

Positioned within the outer ring 138 and at the same distance above the base is an inner ring 142 having space for nutrient vessels 135 around the upper surface thereof. A ring gear 143 is provided on the bottom of the inner ring 142 for rotation thereof.

In order to rotate the two rings 138 and 142 a motor 144 is provided connected by means of bevel gears 146 to a first clutch 147 for driving the inner ring and a second clutch 148 for driving the outer ring. The clutches 147 and 148 are preferably electrically actuated for driving their respective rings through selected angular increments. The output of the inner ring clutch 147 is connected to the inner ring drive gear 143 by means of a bevel gear and the output of the clutch 148 is connected to the outer ring drive gear 141 by means of a bevel gear 151. Thus by activating the appropriate clutch the inner or outer ring can be driven in a counterclockwise direction for advancing a nutrient vessel 135 from station to station.

In operation of the organisms culture apparatus of FIGS. 12 and 13 an outer ring 138 having a plurality of fresh nutrient vessels 135 thereon is placed in position in the apparatus. An empty inner ring 142 is also put in place. The end of the plastic or foil strip 140 which lies over the nutrient vessels 135 is connected to the conical roller 139 and the apparatus is ready for operation. The outer ring is then rotated through an increment by engaging the clutch 148 whereupon the plastic strip is removed from the surface of the nutrient vessel as it is advanced to the inoculation station 134. After inoculation in the manner hereinabove described, the outer ring 138 is again advanced until the inoculated nutrient vessel 135 is at the incubation station 136. Here, incubation proceeds for about one day in substantially the same manner hereinabove described in relation to the preferred embodiment. After incubation has proceeded for a sufficient time the nutrient vessel is advanced to the inner ring 142 by a strip pusher 152 (FIG. 13) and the clutch 147 is immediately engaged to rotate the inner ring 142 and advance the inoculated nutrient vessel 135 to the exposure station 137 where exposure to a sample gas and monitoring of light output is substantially the same as hereinabove described in relation to the preferred embodiment.

After a nutrient vessel 135 is exhausted following use in the exposure station another vessel is advanced from the inoculation station to replace it. Shifting of the two vessels by rotation of the inner ring 142 simultaneously removes the exhausted nutrient vessel from the exposure station as the new one is advanced. The used nutrient vessels are stored in spaced relation on the inner ring counter-clockwise from the exposure station.

In the circumstance where it is found that incubation is not proceeding as desired the nutrient vessel 135 in the incubation station may be rejected merely by rotating the outer ring 138 and concurrently advancing a fresh nutrient vessel to the incubation station. Thus rejected nutrient vessels are stored on the outer ring 138 counter-clockwise from the incubation station.

It is to be understood that the above described embodiments are merely illustrative of the application of the principles of this invention. Obviously, many modifications and variations of the present invention are possible in light of the above teachings. It is therefore to be understood that within the scope of the appended claims the invention may be practiced otherwise than as specifically described.

What is claimed is:

1. A combination for automatically growing culture of microorganisms comprising:
   storage means for storing, one over the other in a stack, a plurality of nutrient vessels holding a sterile nutrient;
   inoculation means for inoculating the nutrient with microorganisms;
   incubation means for incubating the microorganisms in said vessels for stimulating growth thereof;
   first means wherein the incubated microorganisms are utilized;
   transport means for transporting, in turn, the bottom one of said vessels to said inoculation means, said incubation means and said first means, and comprises:
      means for transporting a vessel from said incubation means to said first means, and
      means for transporting a vessel from said inoculation means to said incubation means independent from said means for transporting from said incubation means to said utilization means.

2. A combination as defined in claim 1 wherein:
   said storage means comprises:
      a first magazine having an open end,
      a plurality of said nutrient vessels of sterile solid nutrient medium in said magazine, each of said vessels comprising an upper surface portion, a plurality of cavities in said vessel communicating with said upper surface portion, each of said cavities being filled with a solid nutrient medium for microorganisms to a level substantially flush with at least part of the upper surface portion, an apertured membrane in contact with a major portion of said nutrient medium of each of said cavities for exposing through the aperture only a limited surface area of the solid nutrient medium therein, and a lower surface portion at least partly matable with said upper surface portion of a second similar vessel, and wherein
      the plurality of nutrient vessels are arranged in face-to-back relation within said first magazine whereby pressure of the lower surface portion of one of said vessels against the upper surface portion of an adjacent vessel seals the edges of said cavities in the lower vessel for maintaining sterility of the nutrient medium, and
      means in said first magazine for urging the nutrient vessels toward the open end of said magazine and causing the pressure for sealing,
   said inoculation means comprises:
      an insulated housing,
      means for maintaining the interior of said insulated housing at a first temperature,
      a normally closed door on said insulated housing,
      a liquid storage vessel in said insulated housing,
      means for maintaining a substantially constant liquid level in said liquid storage vessel,
      first and second spaced apart fixed pivot points within said insulated housing, first and second parallel bars mounted at their ends on said first and second fixed pivot points respectively, first and second movable pivot points on the other ends of said first and second parallel bars respectively, means interconnecting said first and second movable pivot points for forming a parallelogram, a substantial vertical probe mounted on said interconnecting means and, reciprocating drive means for oscillating the parallelogram between a first position wherein said probe is dipped into liquid in said liquid storage vessel in said insulated housing and a second position wherein said probe is outside of said insulated housing and adjacent a nutrient medium surface in a nutrient vessel on said transport means whereby a drop of liquid adheres to said probe when dipped into the liquid and at least a portion of the drop is transferred to the nutrient medium surface, said incubation means and said first means each comprise:

an environmental housing having an edge portion sealable against the upper surface portion of one of said nutrient vessels, a plurality of incubation chambers in said environmental housing separately alignable with the cavities in said nutrient vessel, means communicating with each of said chambers for introducing a growth sustaining atmosphere therein, a spring-loaded mounting for said environmental housing for applying a sealing force against a nutrient vessel, a rod connected to said mounting, spring means for urging the said rod away from one of said nutrient vessels, cam means for moving said rod toward one of said nutrient vessels for sealing said housing thereagainst, a photodetector operably connected to said environmental housing of said first means for sensing light therein, and shutter means for selectively exposing each of said chambers to said photodetector, and wherein said transport means comprises:

a first conveyer movable from said inoculation means to said incubation means, a plurality of first trays equally spaced apart on said conveyer, means for advancing said first conveyer in increments equal to the space between said first trays, a second conveyer parallel to said first conveyer, a plurality of second trays equally spaced on said second conveyer, means for transferring a nutrient vessel between a first tray and a second tray, and means for moving a nutrient vessel from said storage means to one of said first trays, and wherein said combination further comprises:

used vessel storage means for receiving used nutrient vessels from said second conveyer, and reject means for receiving vessels from said first conveyer;

said used vessel storage means and said reject storage means each comprising:

a second magazine and a third magazine, respectively and each having an open end, second and third means for retaining nutrient vessels in said second and third magazine, respectively, and fourth and fifth means for moving nutrient vessels from trays on said respective conveyor to said respective magazine.

3. A combination for automatically growing culture of microorganisms comprising:

storage means for storing, one over the other in a stack, a plurality of nutrient vessels holding a sterile nutrient;

inoculation means for inoculating the nutrient with microorganisms;

incubation means for incubating the microorganisms in said vessels for stimulating growth thereof;

first means wherein the incubated microorganisms are utilized;

transport means for transporting, in turn, the bottom one of said vessels to said inoculation means, said incubation means and said first means;

said incubation means comprises:

an environmental housing having an edge portion sealable against one of said vessels;

means for introducing a growth sustaining atmosphere in said housing;

means for bringing said housing and one of said vessels into and out of sealing engagement with each other, and a photodetector operably connected to said housing for sensing light therein;

said means for bringing said housing and one of said vessels into and out of sealing engagement comprises:

a spring loaded mounting for said housing for applying a sealing force;

a rod connected to said mounting;

spring means for urging the rod away from one of said vessels, and means for moving the rod toward one of said vessels for sealing said housing thereagainst.

4. A combination for automatically growing culture of microorganisms comprising:

storage means for storing, one over the other in a stack, a plurality of nutrient vessels holding a sterile nutrient;

inoculation means for inoculating the nutrient with microorganisms;

incubation means for incubating the microorganisms in said vessels for stimulating growth thereof;

first means wherein the incubated microoragnisms are utilized, and transport means for transporting, in turn, the bottom one of said vessels to said inoculation means, said incubation means and said first means;

said first means comprises:

a first housing having a peripheral edge portion sealable against any one of said nutrient vessels;

means for introducing a sample fluid to be tested into said first housing;

means for bringing said first housing and one of said vessels into and out of sealing engagements with each other, and a first photodetector operably connected to said first housing for sensing light therein.

5. A combination for automatically growing culture of microorganisms comprising:

storage means for storing, one over the other in a stack, a plurality of nutrient vessels holding a sterile nutrient;

inoculation means for inoculating the nutrient with microorganisms;

incubation means for incubating the microorganisms in said vessels for stimulating growth thereof;

first means wherein the incubated microorganisms are utilized, and transport means for transporting, in turn, the bottom one of said vessels to said inoculation means, said incubation means and said first means, and comprises:

a first movable conveyer;

a plurality of first vessel receiving trays equally spaced on said first conveyer;
a second movable conveyor;
a plurality of second vessel receiving trays equally spaced on said second conveyer means;
means for transferring vessels between said first trays and said second trays.

6. A combination as defined in claim 5 wherein said first and second conveyers are parallel linear drives.

7. A combination as defined in claim 6 wherein:
each of said first trays includes an upper surface portion for receiving one of said vessels of nutrient medium; and
each of said second trays includes an upper surface portion for receiving nutrient medium vessels, said second tray having the upper surface portion laterally adjacent the upper surface portion of said first tray, whereby nutrient vessels on the upper surface portion of one of said first trays are laterally shiftable to the upper surface portion of the other of said second trays.

8. A combination as defined in claim 7 wherein said first and second conveyers are mounted for independent rotation and further comprising:
means for selectively rotating said first conveyer; and
means for selectively rotating said second conveyer.

9. A combination as defined in claim 8 wherein:
said nutrient vessels of nutrient medium have a removable membrane sealably engaging said nutrient vessels for maintaining sterility thereof.

10. A combination as defined in claim 5 wherein said transport means further comprises:
intermittent drive means for advancing said first conconveyer the distance between a plurality of successive means which include the storage means, inoculation means, and incubation means; and
intermittent drive means for advancing said second conveyor the distance between the first means and a discard means for receiving used nutrient vessels from said first means.

11. A nutrient vessel comprising:
a housing including:
an upper surface portion,
receptacle means for receiving a nutrient and communicating with said upper surface portion,
a lower surface portion at least partly matable with the upper surface portion of a second similar vessel whereby pressure of the lower surface portion of one of said vessels against the upper surface portion of another of said vessels seals the edges of said receptacle means on the lower vessel, and removal of one of said vessels exposes said receptacle means for utilization of nutrient medium therein,
a membrane covering a major portion of said cavity and exposing a minor portion of said cavity for decreasing the surface to volume ratio of nutrient in said cavity.

12. A nutrient vessel comprising:
a housing including:
an upper surface portion,
receptacle means for receiving a sterile nutrient and communicating with said upper surface portion,
a lower surface portion at least partly matable with the upper surface portion of a second similar vessel whereby pressure of the lower surface portion of one of said vessels against the upper surface portion of another of said vessels seals the edges of said receptacle,
said receptacle means comprising a plurality of cavities in said housing, and
each of said cavities being filled with the nutrient for microorganisms to a level substantially flush with a least part of the upper surface portion of said housing, and
an apertured membrane in contact with the respective nutrient to expose only a small portion of the nutrient through the aperture.

13. A nutrient vessel comprising:
a housing including:
an upper surface portion,
receptacle means for receiving a nutrient and communicating with said upper surface portion, and
a lower surface portion at least partly matable with the upper surface portion of a second similar vessel whereby pressure of the lower surface portion of one of said vessels against the upper surface portion of another of said vessels seals the edges of said receptacle means on the lower vessel,
said housing comprising an open rectangular body of resilient material having an upper surface portion and a plurality of webs defining a plurality of rectangular receptacles open at said upper surface portion, and wherein said vessel further comprises:
a nutrient for microorganisms filling each of said cavities substantially flush with said upper surface portion, and an apertured membrane in contact with said nutrient and exposing only a small portion of the nutrient through said aperture.

References Cited

UNITED STATES PATENTS

| | | | |
|---|---|---|---|
| 3,526,480 | 9/1970 | Findl et al. | 23—253 TP X |
| 3,128,239 | 4/1964 | Page | 195—103.5 X |
| 3,509,026 | 4/1970 | Sanders | 195—103.5 |
| 3,370,175 | 2/1968 | Jordon et al. | 195—103.5 X |

A. LOUIS MONACELL, Primary Examiner

M. D. HENSLEY, Assistant Examiner

U.S. Cl. X.R.

195—142, 103.5 R; 198—20; 222—420; 195—139